United States Patent [19]

Savinell et al.

[11] Patent Number: 5,525,436
[45] Date of Patent: Jun. 11, 1996

[54] PROTON CONDUCTING POLYMERS USED AS MEMBRANES

[75] Inventors: Robert F. Savinell, Solon; Morton H. Litt, University Heights, both of Ohio

[73] Assignee: Case Western Reserve University, Cleveland, Ohio

[21] Appl. No.: 332,869

[22] Filed: Nov. 1, 1994

[51] Int. Cl.$^6$ .................................................. H01M 8/10
[52] U.S. Cl. ........................... 429/30; 429/33; 204/296; 204/252; 521/27; 521/30; 521/33; 548/335.1; 548/343.5; 548/152; 548/156; 548/217; 548/219; 548/125; 548/215; 548/146; 546/348; 546/152
[58] Field of Search .................. 429/30, 33; 204/296, 204/252; 521/27, 30, 33; 548/335.1, 343.5, 152, 156, 217, 219, 125, 215, 146; 546/348, 152; 544/242, 224, 383; 534/751, 770

[56] References Cited

U.S. PATENT DOCUMENTS

| | | | |
|---|---|---|---|
| 4,020,142 | 4/1977 | Davis et al. | 264/347 |
| 4,085,090 | 4/1978 | Hara et al. | 260/49 |
| 4,113,683 | 9/1978 | Kalnin et al. | 260/857 TW |
| 4,309,372 | 1/1982 | Sheibley | 264/45.3 |
| 4,664,761 | 5/1987 | Zupancic et al. | 429/30 |

*Primary Examiner*—Kathryn Gorgos
*Attorney, Agent, or Firm*—Fay, Sharpe, Beall, Fagan, Minnich & McKee

[57] ABSTRACT

The subject invention relates to solid polymer electrolyte membranes comprising proton conducting polymers stable at temperatures in excess of 100° C., the polymer being basic polymer complexed with a strong acid or an acid polymer. The invention further relates to the use of such membranes in electrolytic cells and acid fuel cells. Particularly, the invention relates to the use of polybenzimidazole as a suitable polymer electrolyte membrane.

32 Claims, 6 Drawing Sheets

PROTON CONDUCTING POLYMERS USED AS MEMBRANES

FIELD OF THE INVENTION

The invention-relates to a solid polymer electrolyte useful in fuel cells operated at elevated temperatures. More specifically, the invention is related to the use of a polymer electrolyte membrane capable of conducting protons at temperatures up to at least 200° C. in fuel cells operating on liquid fuels.

BACKGROUND OF THE INVENTION

In the past decade considerable effort has gone into the development and characterization of perfluorosulfonic acid polymer electrolytes such as Nafion. These efforts have shown that polymer electrolyte membranes (PEM) offer a number of advantages over conventional electrolytes when used in electrochemical devices such as fuel cells and water electrolyzers. Unfortunately, these electrolytes must remain hydrated to retain ionic conductivity, which limits their maximum operating temperature to 100° C. at atmospheric pressure.

This disadvantage of known PEM materials, therefore, is highlighted in those systems in which a polymer electrolyte with high conductivity at temperatures in excess of 100° C. would be useful. One such application is the $H_2/O_2$ fuel cell that utilizes reformed hydrogen from organic fuels (methane, methanol, etc.) which will have a certain amount of CO that poisons the electrode catalysts. Another such application is the direct methanol fuel cell. Present direct methanol-air fuel cell configurations are severely limited by the lack of sufficiently active catalysts for the methanol anode, and to a lesser extent, the oxygen cathode. This is a direct result of catalyst poisoning caused by carbon monoxide produced by the fuel at operating temperatures of about 100° C. or lower.

Another disadvantage of known PEM methanol-air fuel cells is seen in poor performance of the fuel cells due to the high rate of methanol cross-over from the anode to the cathode through the membrane, which results in a loss of efficiency via chemical reaction of the fuel with oxygen and consequent depolarization of the cathode.

The use of solid polymer electrolytes offers new opportunities to overcome these catalyst stability and activity problems, provided the polymers selected are stable and retain reasonable ionic conductivity at temperatures approaching 200° C., avoiding anode/cathode poisoning effects. Further, such polymers should have other desirable properties, such as low methanol permeability to reduce the efficiency losses resulting from crossover.

It has now been discovered that films comprising polymers containing basic groups that can form complexes with stable acids or polymers containing acidic groups provide a viable alternative to known PEM's and other conventional electrolytes. Polybenzimidazole (PBI) which has been doped with a strong acid, such as phosphoric acid or sulfuric acid, is an example of a suitable polymer. Polybenzimidazoles, along with other suitable aromatic polymers, basic enough to complex with acids, exhibit excellent oxidative and thermal stability characteristics, these properties being further enhanced by doping at a level of at least 200 mol %. They require low water activity, thus avoiding operating temperature limits due to the boiling point of water. Capability to operate at elevated temperatures, i.e. up to at least 200° C., also reduces the potential for anode/cathode poisoning. Further, they do not suffer significantly from methanol cross-over because of low methanol swelling with methanol vapor and high glass transition temperatures.

It is, therefore, an object of the subject invention to provide a solid polymer electrolyte which does not suffer from known problems associated with catalyst stability and activity.

It is another object of the invention to provide a solid polymer electrolyte which is stable and retains reasonable ionic conductivity at up to at least 200° C.

It is still another object of the invention to provide a solid polymer electrolyte which is suitable for use in direct methanol fuel cells without exhibiting high methanol permeability resulting in loss in efficiency due to methanol crossover.

SUMMARY OF THE INVENTION

The subject invention relates to solid polymer electrolyte membranes comprising proton conducting polymers stable at temperatures in excess of 100° C., the polymer being basic polymer complexed with a strong acid or an acid polymer. The invention further relates to the use of such membranes in electrolytic cells and acid fuel cells. Particularly, the invention relates to the use of polybenzimidazole as a suitable polymer electrolyte membrane.

BRIEF DESCRIPTION OF THE DRAWINGS

FIGS. 5a–5c are graphs illustrating the polarization and power density curves for a PBI fuel cell, wherein FIG. 5a shows cell voltage as a function of current, FIG. 5b shows individual cathode and anode potentials, and FIG. 5c shows power of the cell as a function of current density.

DETAILED DESCRIPTION OF THE INVENTION

The invention relates to novel solid polymer electrolytes which are stable and retain sufficient ionic conductivity at temperatures up to at least 200° C. to overcome known catalyst stability and conductivity problems. Specifically, the invention relates to the use of polymers containing basic groups that can form complexes with stable acids, or polymers containing acidic groups which can be used to form films suitable for use as a solid polymer electrolyte membrane in methanol-air fuel cells. Examples of such polymers include, but are not limited to polybenzimidazole, poly(pyridine), poly(pyrimidine), polyimidazoles, polybenzthiazoles, polybenzoxazoles, polyoxadiazoles, polyquinoxalines, polythiadiazoles, and poly(tetrazapyrenes). Of particular interest herein is polybenzimidazole (PBI), doped with a strong acid, such as phosphoric acid or sulfuric acid. These polymer films exhibit excellent oxidative and thermal stability; these properties being further enhanced by the acid nature of the polymer.

The subject solid polymer electrolyte membrane exhibits stable chemical and electrical properties at temperatures well above 100° C. and up to at least 200° C. has good mechanical and film properties, demonstrates high proton conductivity and low fuel permeability, and is capable of conducting protons with very low water activity.

The polymer used in the subject invention may be a polymer containing basic groups that are capable of forming complexes with stable acids. For example, the PBI polymer, when doped with a strong or stable acid, such as phosphoric acid or sulfuric acid, results in a polymer electrolyte which readily forms a single phase system wherein the acid is dissolved in the polymer, as opposed to conventional phosphoric acid systems in which the acid is merely held in the pores of the inert second phase of the polymer system.

Presently known commercially available sulfonic acid ionomers, e.g. Nafion 117 and Dow 560, depend on water to solvate the protons generated by the ionization of the sulfonic acid groups. When the polymers are subjected to temperatures above 100° C. at one atmosphere pressure, water is lost, including the water solvating the hydronium ions. The membrane shrinks and conductivity is lost. The use of a pressurized system can extend the useful temperature range, but at the expense of overall system efficiency, size and weight. For example, temperatures of 120° C. can be approached at pressures of about 2 atm. of water. Further, at an operating temperature of 200° C. the pressure required for these membranes is too high to be of practical use.

Suitable basic polymers which form complexes with stable acids include: polybenzimidazoles, poly(pyridines), poly(pyrimidines), polyimidazoles, polybenzthiazoles, polybenzoxazoles, polyoxadiazoles, polyquinoxalines, polythiadiazoles, and poly(tetrazapyrenes). The polymers may contain a variety of functional groups, as seen below using the polybenzimidazole polymer as an example:

wherein R is:

alkane chain, fluoro alkane chain, and like linkages. Examples of other basic polymers are listed below.

The following polymers may be slightly less stable than the above at 200° C. for long periods but should function well at lower temperatures still above 100° C.:

where $R_1$=H, alkyl, phenyl, pyridyl, each independently of any other $R_1$, linkage.

Another suitable polymer, which functions similarly is polybenzobisimidazole, wherein R and $R_1$ are as defined hereinabove.

Further, in the above polymers, the $NR_1$ functionality may be replaced by X, wherein X=O or S.

The basic polymers recited lend themselves readily to protonation, and exhibit enhanced thermal stability when the molecule consists only of aromatic groups. Other suitable basic polymers which can be substituted with the foregoing

R, $R_1$, and X groups include oxazoles:

thiazoles:

poly (oxadiazoles) and thiadiazoles, both as the main basic group and as a linking group for benzimidazole, benzoxazole and benzthiazole polymers.

The recited linkages may be used in all possible positions, and copolymers may be formed from all possible groups, as would be known to the skilled artisan.

Of the foregoing, the quinoxalines are the least desired because they are the least basic of the recited polymers, though if doped, they will perform well as a PEM. Those polymers contemplated for use herein which demonstrate solubility in dilute acid may be made more stable by cross-linking in place in the film by any one of a number of known cross-linking techniques, including free radical cross-linking.

Of the foregoing, the preferred basic polymers include poly(pyrimidines), polyimidazoles, and polybenzoxazoles, and most preferred basic polymers are polybenzimidazole, which is used as the exemplary polymer in the remainder of this disclosure, and poly(pyridines).

Suitable polymers also include acid polymers, or polymers containing acid groups, such as sulfonates, phosphonates, boronates, etc. For example, and similar polymers, wherein R is as defined hereinabove, Y is —O—, —S—, —SO$_2$—, —CH—, or CH$_2$, and n is 0 to 1.

All polymers shown herein to contain sulfuric acid groups, with the exception of the polybenzimidazoles, may be made with boric acid groups or phosphoric acid groups as well. This is accomplished by halogenating the polymer backbone and reacting it with trialkyl- or aryl-borates or trialkyl- or aryl-phosphates.

Of the foregoing, the sulfonates are preferred acid group-containing polymers and phosphonates are the most preferred acid group-containing polymers.

The preferred PEM polybenzimidazole membranes, are prepared by synthesis of the polybenzimidazole film, which is doped with a strong acid, such as sulfuric or phosphoric acid, to produce a polymer with the acid anion bound to the protonated polybenzimidazole. The protons are ionized by the basic nitrogen atoms in the benzimidazole rings as shown below:

In general, any polymer with a basic group B can be protonated by a strong acid, such as phosphoric acid to make a solid polymer electrolyte.

$$(B-R)_x$$
$$H^+$$
$$H_2PO_4^-$$

the PBI's, given the foregoing, are known to have excellent oxidative and thermal stability, and are further stabilized by reaction with the doping acid. In the case of sulfuric acid, reaction at temperatures exceeding 200° C. sulphonates the benzene ring to form attached SO$_3$H groups. Proton hopping between basic sites on the polymer compound and/or with imbibed free acid provides enhanced ionic conductivity. Further, the barrier properties of these films are enhanced due to the single phase morphology of the material, as compared to the biphasic nature of the non-polar fluorocarbon/polar ionic membranes. "Single phase morphology" refers to a microscopic continuous matrix of a single material as contrasted to a two-phase system of a polar phase mixed with a non-polar phase.

In operation in a fuel cell utilizing a suitable fuel, such as methanol, the PBI polymer electrolyte membrane conducts protons from the fuel electrode to the oxygen cathode. Carbon monoxide, present in fuels like reformed hydrogen, poisons the platinum catalyst commonly used in fuel cells. Liquid fuels like methanol produce even more severe poisoning effects because carbon monoxide is an intermediate in the fuel oxidation process. However, at higher temperatures, approaching 200° C., the cell operation stimulates carbon monoxide oxidation to carbon dioxide, resulting in substantially enhanced catalyst activity in spite of the poisoning effect of the carbon monoxide. Prior to the subject invention, however, which is operable at temperatures of up to at least 200° C., no proton conducting polymer electrolytes were available.

The foregoing characteristics of the PBI polymer will be exhibited by other polymers of the type described hereinabove suitable for use as polymer electrolyte membranes. For instance, polybenzimidazoles, poly(pyridines), poly(pyrimidines), polyimidazoles, polybenzthiazoles, polybenzoxazoles, polyoxadiazoles, polyquinoxalines, polythiadiazoles, poly(tetrazapyrenes) will each have a single phase morphology, thus exhibiting high proton conductivity and low methanol permeability.

The invention will now be discussed with reference to the preferred embodiment of the invention, i.e. use of polybenzimidazole polymer. The following example and related test data is intended to be merely exemplary and in no way intended to be limitative of the subject invention. Viable variations of the parameters presented, as well as other aspects of the materials, their preparation and their use, will be apparent to those skilled in the art and are intended to be covered by this specification and the appended claims if falling within the meets and bounds thereof. For instance, the skilled artisan will be able to substitute suitable polymers as described hereinabove for the exemplified polymers and obtain sound results.

PEM Preparation

Films of polybenzimidazole were prepared by dissolving the polymer (20%) in dimethylacetamide (DMAc) containing LiCl (2%) and then spreading on a clean glass plate using a Gardner knife. The film was heated at 140° C. in air for 15 minutes. It was removed from the glass plate and heated in a vacuum oven overnight at 90° C. to dry the film. The LiCl was then extracted from the film with water. The films were doped with $H_2SO_4$ or $H_3PO_4$ by acid sorption from aqueous solutions.

In order to more fully demonstrate the capabilities of the subject PBI, other polymer electrolyte membranes were obtained and evaluated under like testing conditions. In the following text, Nafion membranes were prepared as follows: Nafion 117 (acid form) membranes were obtained from dupont and hydrated by immersion in boiling water for four hours. Following hydration, the samples were either left in distilled water until use or were equilibrated with phosphoric acid.

Conductivity Measurements

Conductivity measurements were made with a four point probe apparatus. In this apparatus, two platinum foil electrodes were clamped to the end of a 3 cm(L)×0.5 cm(W) polymer sample. These electrodes were used to pass current through the sample. The magnitude and frequency of the applied current were controlled using a PAR 173 potentiostat/galvanostat and a Wavetek 186 signal generator. Two platinum wires (0.5 mm diameter), spaced 1 cm apart, were used to measure the voltage drop at the center of the sample. Voltage measurements were made at three or more current levels to ensure that the voltage-current behavior was ohmic. The current was applied at two different frequencies, 100 and 1000 Hz. No frequency dependence was observed. The entire apparatus was contained within a sealed stainless steel vessel, which was placed inside an oven and connected to a gas manifold system so that the temperature, pressure and composition of the gas phase in contact with the sample could be controlled. Measurements as a function of water partial pressure above 100° C. were performed by partially evacuating the cell and then injecting sufficient liquid water via a septum to yield the desired water partial pressure.

Conductivity results are shown below in Table 1 for films at 170° C. and 400 torr water partial pressure. Conductivity and voltage drop for a fuel cell operating at 100 mA/cm$^2$ are shown. This PBI sample contained approximately 250 mol % $H_2SO_4$, i.e. about 2.5 molecules of $H_2SO_4$ to each polymer repeat unit.

TABLE I

MEMBRANE CONDUCTIVITY

| Membrane/ Electrolyte | Conditions | Conductivity/ ohm$^1$ cm$^1$ | Voltage loss at 100 mA/cm$^2$ |
|---|---|---|---|
| Nafion 117 | 80° C. SAT $H_2O$ | 0.07 | 29 mV |
| Nafion 117 | 120° C. 400 torr $H_2O$ | 0.0036 | 555 mV (8 mil) |
| PBI/$H_2SO_4$ | 170° C. 400 torr $H_2O$ | 0.02 | 25 mV (2 mil) |
| PBI/$H_3PO_4$ | 180° C. 408 torr $H_2O$ | 0.01 | 50 mV |

Figure 1:
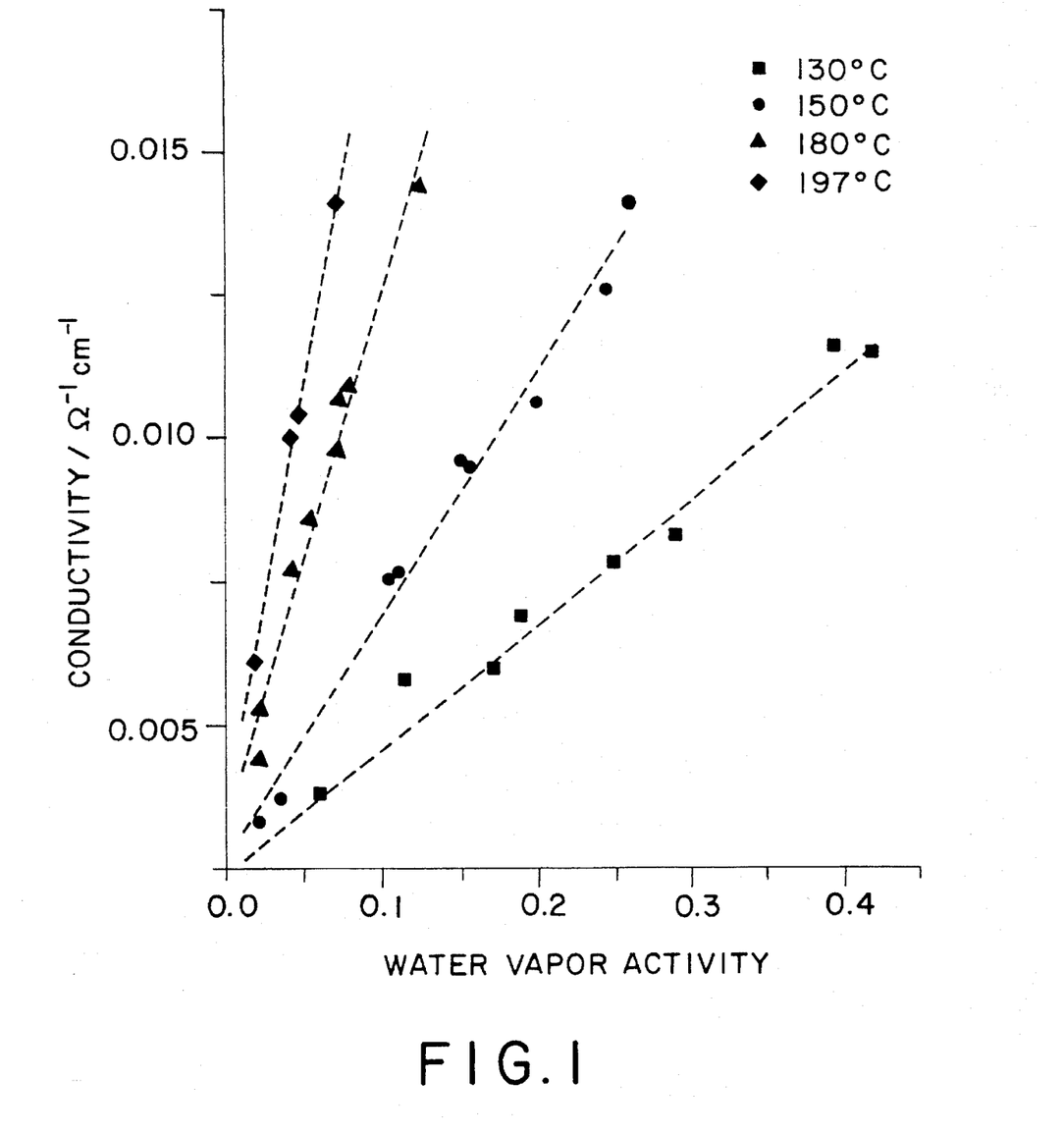
FIG. 1 is a graph illustrating the conductivity of phosphoric acid doped PBI as a function of temperature and water partial pressure.

The conductivity results for the phosphoric acid doped polybenzimidazole material are further shown in FIG. 1, as a function of temperature and water partial pressure. This PBI sample contained approximately 334 mol %$H_3PO_4$, i.e., about 3.34 $H_3PO_4$ molecules to each repeat unit. In this graph, the conductivity is plotted as a function of water activity for temperatures from 130° to 197° C. The conductivity increases with temperature and water activity. The greater the conductivity, the lower the ohmic loss in the fuel cell and thus the greater its efficiency. These conductivities are at least an order of magnitude greater than that of Nafion under similar conditions.

Permeability Measurements

The permeability of oxygen through a PBI film doped with $H_2SO_4$ according to the subject invention was measured using the closed volume technique. Permeability was measured in the same manner for a Nafion 117 film equilibrated with phosphoric acid and Nafion equilibrated with water. The results are summarized in Table II. The current density column represents the current density equivalent to the flux across the membrane with a one atmosphere pressure differential as a driving force. The equivalent current density was calculated as i=nFN where n=4 for the oxygen reduction reaction, F is Faraday's constant and N is the flux,

TABLE II

OXYGEN PERMEABILITY

| Membrane/Electroylte | Temperature/°C. | Current Density/mA/cm$^2$ |
|---|---|---|
| PBI/H$_2$SO$_4$ | 80 | 0.08 |
| Nafion 117/H$_2$O | 80 | 0.6–0.8 |
| Nafion 117/H$_3$PO$_4$ | 123 | 0.35–0.45 |
| Nafion 117/H$_3$PO$_4$ | 150 | 0.25–0.67 |

The permeability of oxygen in the phosphoric acid equilibrated Nafion at temperatures above 100° C. is similar to that in water equilibrated Nafion at 80° C. These permeabilities surpass that of oxygen in phosphoric acid. Thus, cathode performance is enhanced by the presence of Nafion since O$_2$ can more easily access catalyst sites. The loss of O$_2$ to crossover is not of concern since O$_2$ has a low solubility. The lowest oxygen permeability was obtained with the polybenzimidazole material which was expected to show good barrier properties. However, these permeabilities should still be adequate for fuel cell applications.

The permeabilities of other gases in acid doped PBI are shown in Table III. The methanol crossover rate with PBI is on the order of 5–11 mA/cm$^2$. This amount of crossover is low compared to the values of 100–250 mA/cm$^2$ reported for liquid feed direct methanol fuel cells with Nafion 117 at 80° C. as shown by measures of 250 mA/cm$^2$ based on prevaporation data in S. Kato, et al, *J. Membrane Science*, 72 (1992).; 100 mA/cm$^2$ in liquid feed PEM cells in S. Narayanan, et al., Extended Abstracts of Electrochemical Society, Vol. 93-2, p. 126, Pennington, N.J. (1993); and 100 mA/cm$^2$ at 100 ASF in liquid feed PEM cells in D. Maricle, et al., Extended Abstracts of Electrochemical Society, vol. 94-1, p. 58, Pennington, N.J., (1994).

TABLE III

PERMEABILITY OF DOPED POLYBENZIMIDAZOLE

| Doping | Gas | Temperature/°C. | Permeability | Equivalent CD/mA/cm$^2$ |
|---|---|---|---|---|
| H$_2$SO$_4$ | Methanol | 85 | 175, 320 | 7, 13 |
| H$_2$SO$_4$ | Methanol | 130 | 139, 156 | 5, 6 |
| H$_3$PO$_4$ | Methanol | 130 | 183, 186 | 7, 7 |
| H$_3$PO$_4$ | Methanol | 155 | 270 | 11 |
| H$_2$SO$_4$ | Water | 130 | 9000, 10000 | — |
| H$_3$PO$_4$ | Water | 140 | 4400 | — |
| H$_3$PO$_4$ | Hydrogen | 150 | 180 | 2 |
| H$_2$SO$_4$ | Oxygen | 125 | 11, 20 | 0.3, 0.6 |
| H$_3$PO$_4$ | Oxygen | 140 | 10 | 0.3 |

Permeability Coefficients are given in barrer
1 barrer = 10$^{-10}$ cm$^3$(STP)cm/cm$^2$s cmHg
Multiple entries indicate results from multiple samples.
Equivalent current densities assume a one atmosphere pressure differential.
H$_2$SO$_4$ doping level 247 mol %
H$_3$PO$_4$ doping level 338 mol %

Thermal Stability Measurements

Figure 2:
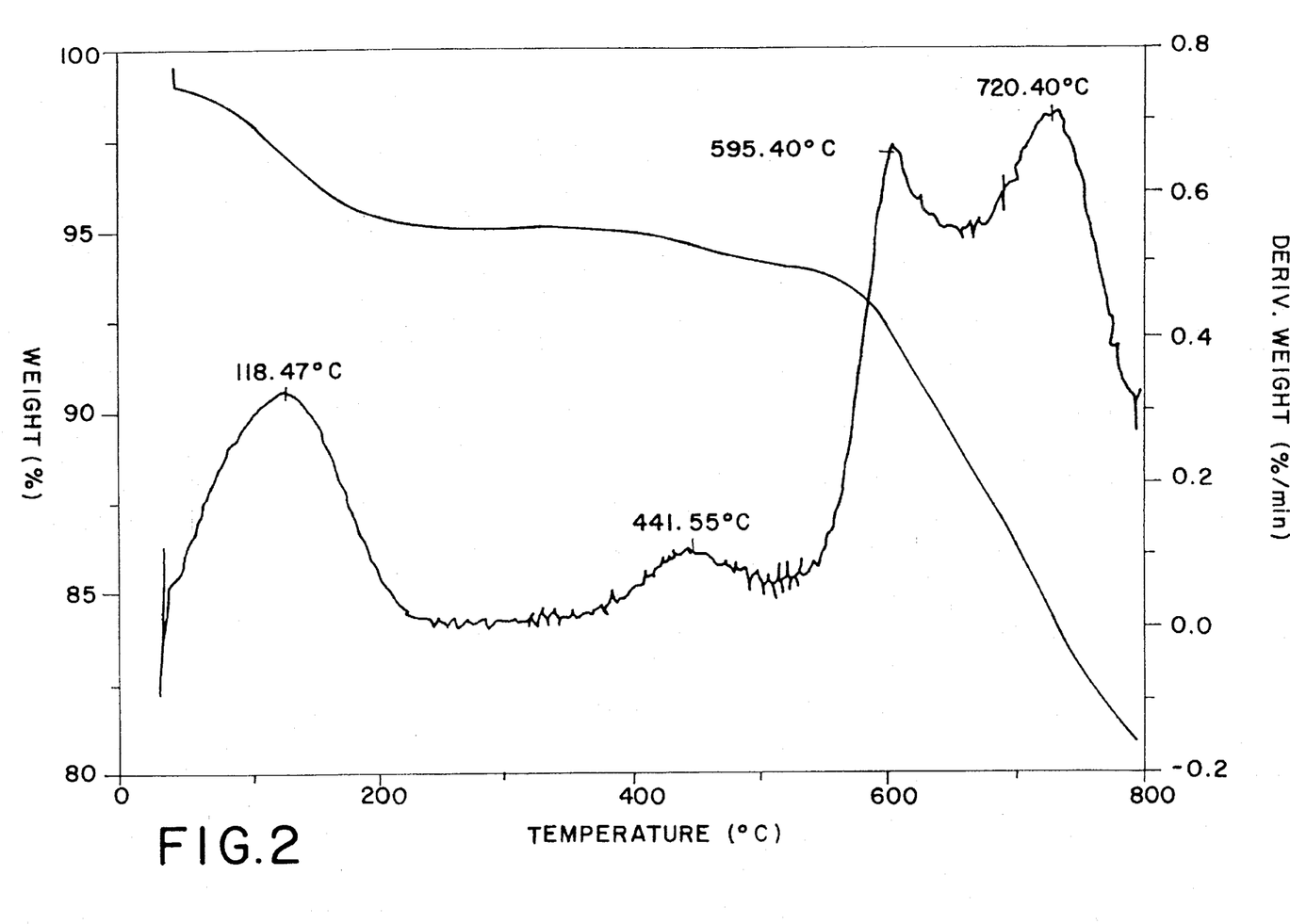
FIG. 2 is the thermogravimetric analysis scan for undoped PBI film.
Figure 3:
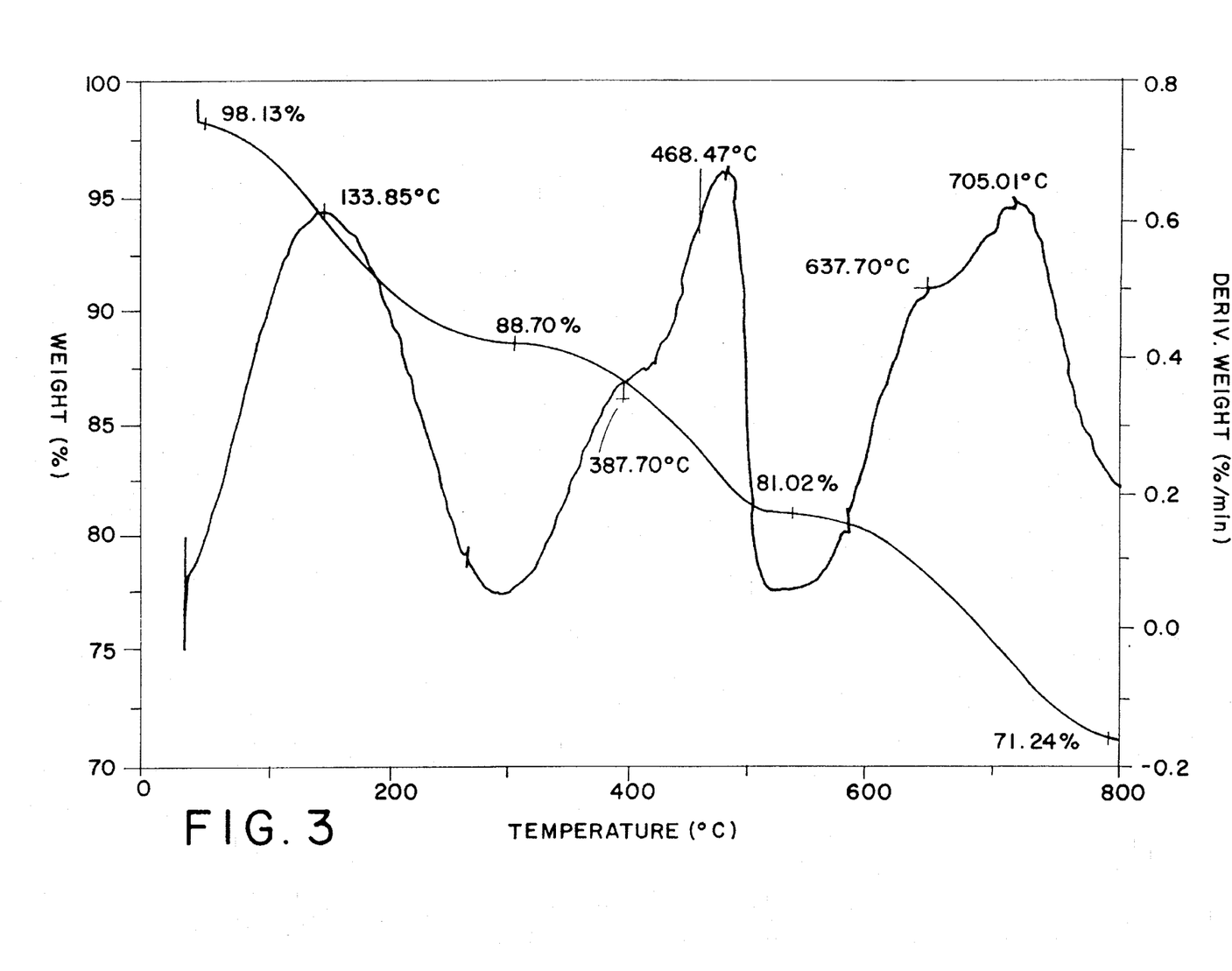
FIG. 3 is the thermogravimetric analysis scan for PBI film doped with 20 mol % sulfuric acid.

Thermogravimetic Analysis (TGA) has been used to study the thermal stability of polybenzimidazole and to follow the reaction between PBI film and sulfuric acid. In FIG. 2, the TGA scan for an undoped PBI film in nitrogen is shown. The heating rate was 10° C./min. The PBI film lost water at about 80° C. and underwent thermal degradation at 550° C. The TGA of PBI doped with approximately 20 mol % sulfuric acid is shown in FIG. 3. This result shows a loss of water at 100° C. and also showed two further weight losses starting at 330° C. and 415° C. The first loss at 330° C. is attributed to the reaction of the acid with PBI to generate sulfonic acid groups while the second loss is probably due to loss of SO$_2$ or SO$_3$ from the polymer. The weight loss due to thermal degradation has been shifted to 600° C. which indicates that the reaction with the sorbed acid improved the thermal stability of the film.

Figure 4:
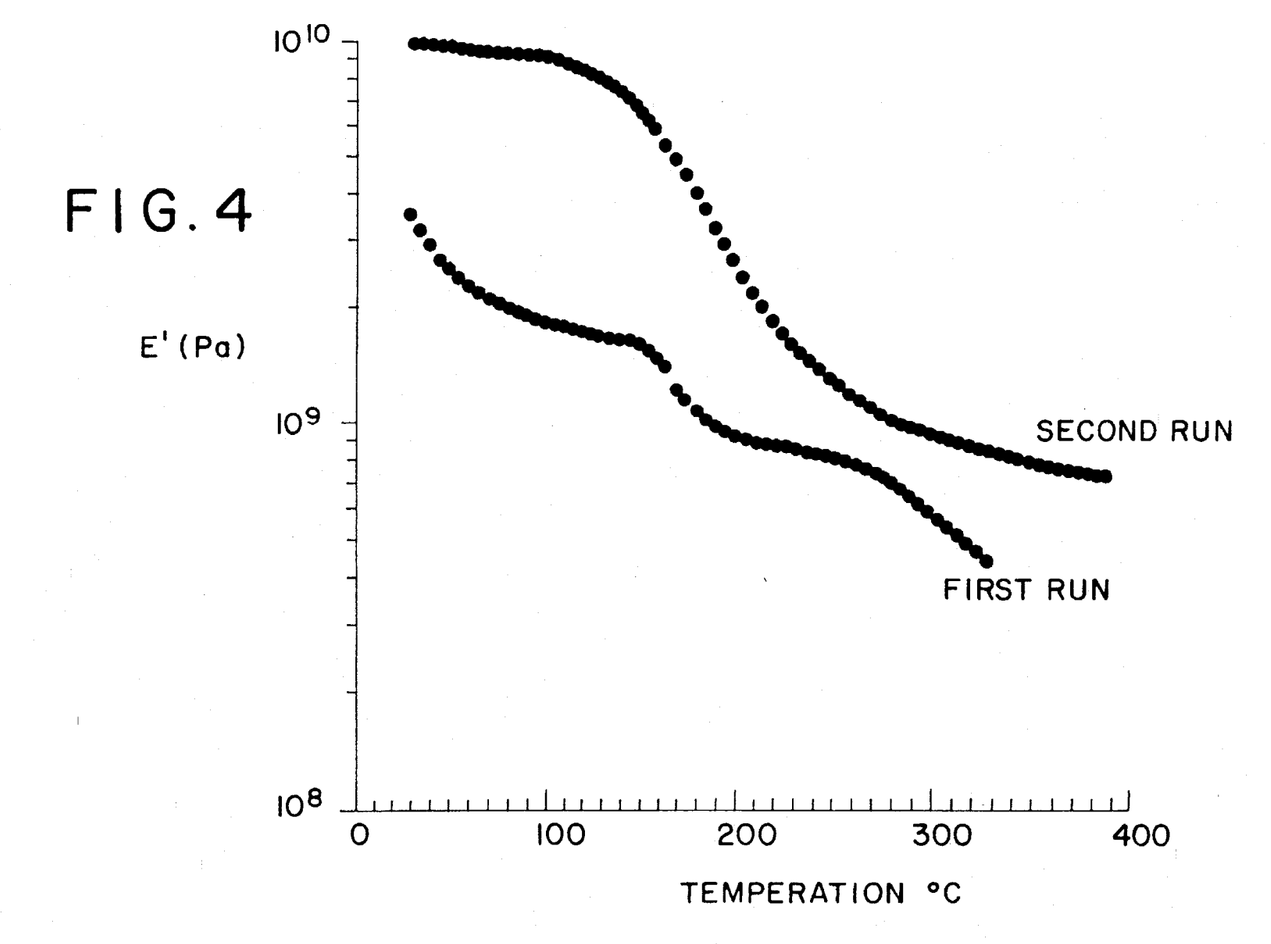
FIG. 4 is a graph illustrating the dynamic mechanical spectroscopy of phosphoric acid doped PBI film.

FIG. 4 shows the dynamic mechanical spectroscopy of a PBI film doped with 320 mol % phosphoric acid (this film is about 50 wt. % phosphoric acid). The modulus at room temperature before heating is normal for a glassy polymer. In the first heating, the modulus drops and reaches a plateau of about 2×10$^9$ Pascals. Between 160°–200° C., the modulus dropped to about 8×10$^8$ Pascals and reached a plateau. Upon the second heating, the modulus was much higher (1×10$^{10}$ Pascals) which started to drop at 150° C. and reached a plateau of 1×10$^9$. In use as a fuel cell, the PEM modulus will be about 3×10$^9$. This value is about 10$^4$ times higher than Nafion at 150° C. The stiffer membrane can be made thinner without deformation when put into a fuel cell. Thinner membranes will have less electrical resistance and thus will be more efficient.

Figure 5A:
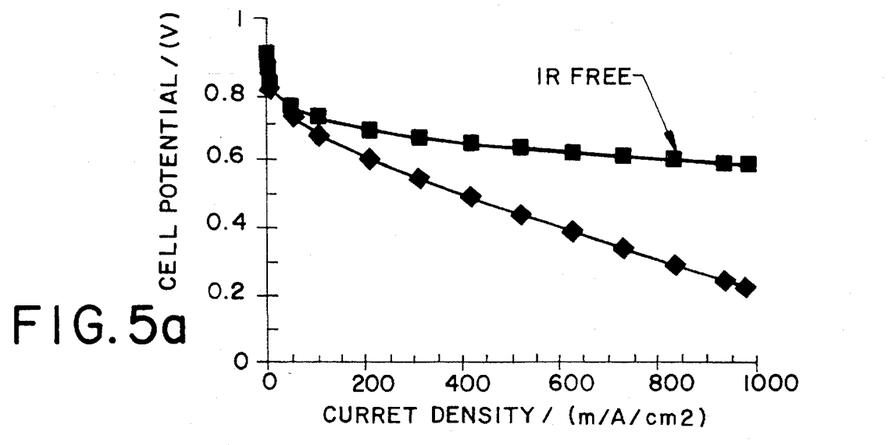
Figure 5B:
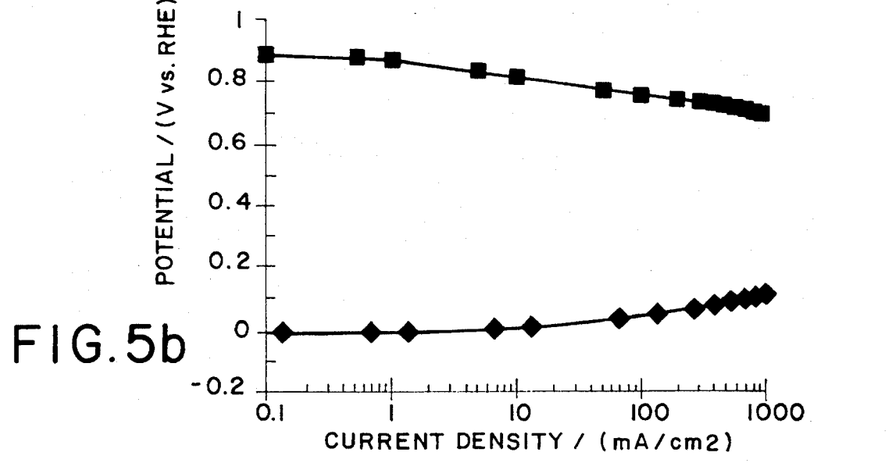
Figure 5C:
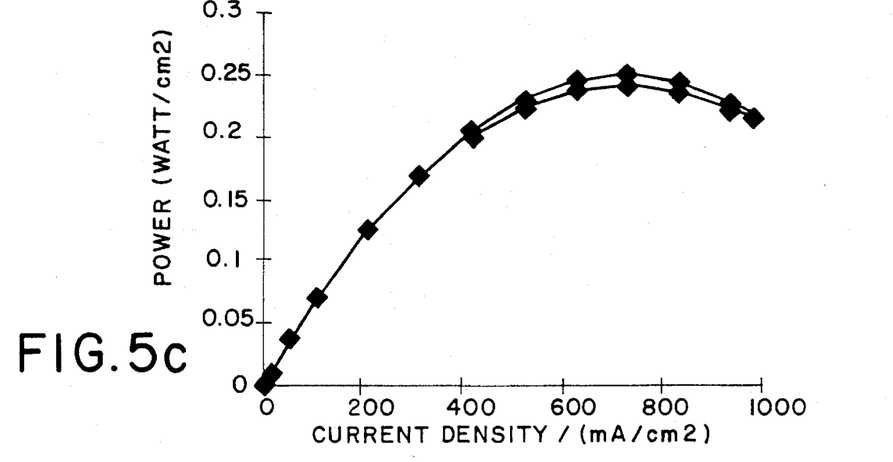

In FIG. 5, the polarization and power density curves for a PBI fuel cell operating on hydrogen and oxygen at 150° C. are shown. The membrane was a 470 mol % H$_3$PO$_4$ doped PBI 0.075 mm film. The gasses were humidified at very low levels (20° C. O$_2$, 48° C. H$_2$). These tests were done in a one square centimeter microfuel cell with platinum on carbon supported electrodes (0.5 mg Pt/cm$^2$). In FIG. 5A, the cell voltage as a function of current is shown. The IR-free curve represents the data when the membrane ohmic loss is subtracted. This curve demonstrates the efficiency of the electrodes (more efficient at higher voltage values). The power of the fuel cell is the product of the voltage and current and is shown in FIG. 5C. This curve shows a maximum power of approximately 0.25 W/cm$^2$ at about 700 mA/cm$^2$. This power level is quite high for a PEM fuel cell considering the operating temperature and lack of substantial gas humidification. The curves in FIG. 5B show the individual cathode and anode potentials which indicate that electrode voltage losses are very low below 10 mA/cm$^2$. This fuel cell is not optimized and the performance can be improved with use of thinner membranes and better electrode structures.

Figure 6:
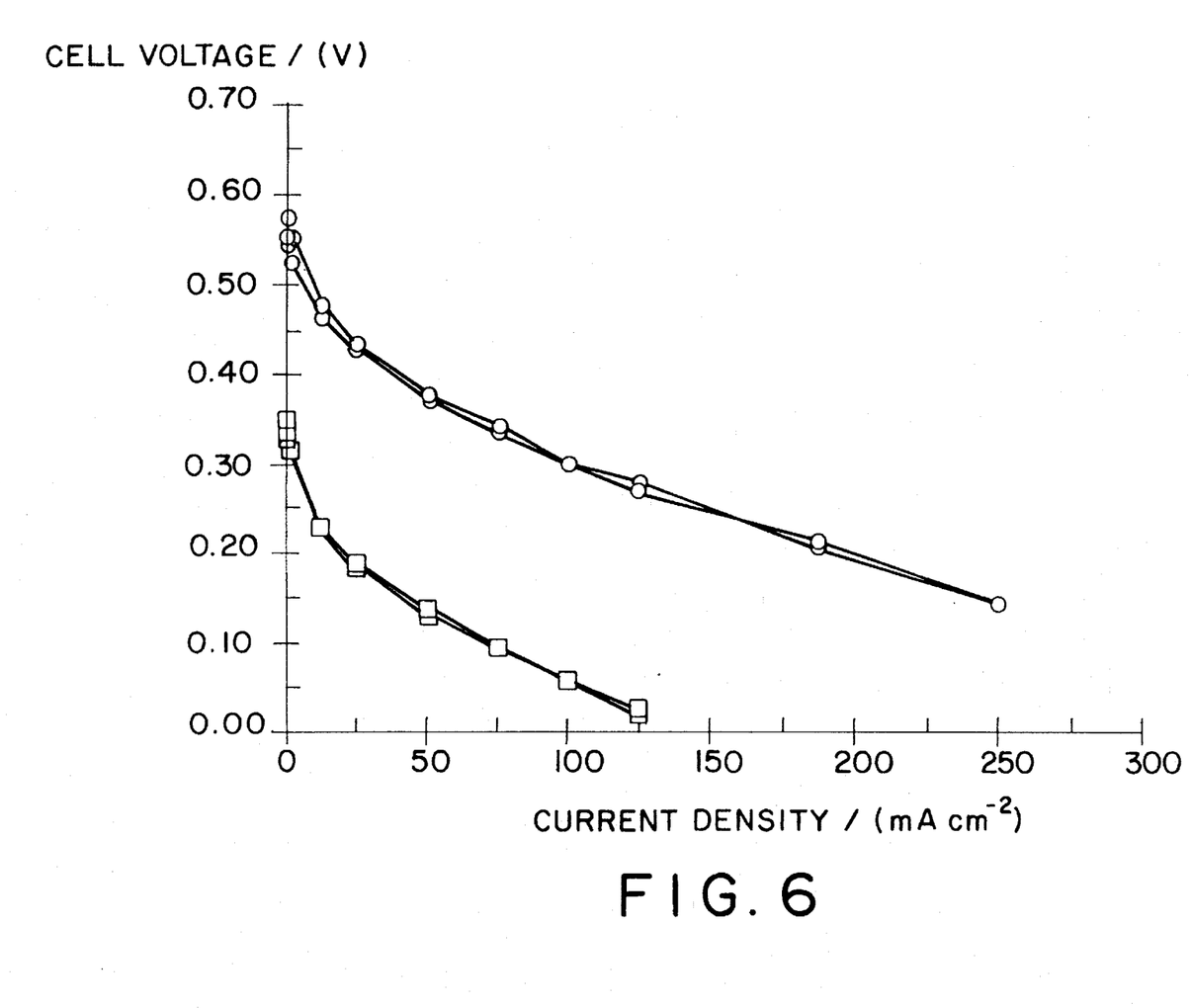
FIG. 6 is a graph illustrating the polarization curve of a PBI fuel cell operating on methanol:water fuel and oxygen as the oxidant, and comparing a Pt anode and a Pt/Ru anode.

In FIG. 6, the polarization curve of a PBI fuel cell operating on methanol:water mixture for the fuel and oxygen as the oxidant is shown. The cathode was 4 mg/cm$^2$ Pt on carbon while the anode was 1.2 mg/cm$^2$ Pt/Ru alloy. The membrane was 450 mol % H$_3$PO$_4$/PBI 0.075–0.09 mm film. For comparison, an anode with Pt black catalyst is also reported. In this un-optimized methanol fuel cell operating at 150° C., a cell voltage of 0.3 volts at 100 mA/cm$^2$ has been achieved.

The invention has been described by way of example. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A solid polymer electrolyte membrane comprising a proton conducting polymer stable at temperatures in excess of 100° C. wherein said proton conducting polymer is a polymer doped with a strong acid at an acid doping level of at least 200 mol %.

2. The solid polymer electrolyte membrane according to claim 1 wherein said polymer is selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles.

3. The solid polymer electrolyte membrane according to claim 2 wherein said polymer is an aromatic polymer.

4. The solid polymer electrolyte membrane according to claim 1 wherein said polymer is selected from the group consisting of poly(pyrimidines), polyimidazoles, polybenzoxazoles, poly(pyridines), and polybenzimidazoles.

5. The solid polymer electrolyte membrane according to claim 1 wherein said polymer is polybenzimidazole.

6. The solid polymer electrolyte membrane according to claim 1 wherein said strong acid is selected from the group consisting of sulfuric acid and phosphoric acid.

7. The solid polymer electrolyte membrane according to claim 1 wherein said proton conducting polymer is an acid polymer.

8. The solid polymer electrolyte membrane according to claim 7 wherein said acid polymer is selected from the group consisting of sulfonic acid polymers, phosphonic acid polymers and boronic acid polymers.

9. The solid polymer electrolyte membrane according to claim 7 wherein said acid polymer is a sulfonic acid polymer.

10. A high temperature proton conducting polymer comprising a polymer complexed with a strong acid which conducts protons at temperatures in excess of 100° C. wherein said proton conducting polymer is a polymer doped with a strong acid at an acid doping level of at least 200 mol %

11. The high temperature proton conducting polymer of claim 10 wherein said polymer is an aromatic polymer.

12. The high temperature proton conducting polymer of claim 10 wherein said polymer is selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles.

13. The high temperature proton conducting polymer of claim 10 wherein said polymer is selected from the group consisting of poly(pyrimidines), polyimidazoles, polybenzoxazoles, poly(pyridines), and polybenzimidazoles.

14. The high temperature proton conducting polymer of claim 10 wherein said polymer is polybenzimidazole.

15. The high temperature proton conducting polymer of claim 10 wherein said strong acid is selected from the group consisting of sulfuric acid and phosphoric acid.

16. A hydrogen or direct methanol fuel cell comprising: (a) an anode; (b) a cathode; and (c) an acid doped basic polymer electrolyte membrane which conducts protons at temperatures in excess of 100° C. wherein said proton conducting polymer is a polymer doped with a strong acid at an acid doping level of at least 200 mol %.

17. The hydrogen or direct methanol fuel cell according to claim 16 wherein said polymer electrolyte membrane exhibits low fuel permeability.

18. The direct methanol fuel cell according to claim 16 wherein said acid doped polymer electrolyte derived from a polymer is selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles.

19. The direct methanol fuel cell according to claim 16 wherein said polymer is selected from the group consisting of poly(pyrimidines), polyimidazoles, polybenzoxazoles, poly(pyridines), and polybenzimidazoles.

20. The direct methanol fuel cell according to claim 16 wherein said acid doped polymer electrolyte derives from polybenzimidazole.

21. The direct methanol fuel cell according to claim 16 wherein said acid is a strong acid.

22. The direct methanol fuel cell according to claim 16 wherein said acid is selected from the group consisting of sulfuric acid and phosphoric acid.

23. An acid fuel cell containing a solid polymer electrolyte membrane comprising an acid doped polymer.

24. The acid fuel cell according to claim 23 wherein said polymer is selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles.

25. The acid fuel cell according to claim 23 wherein said polymer is selected from the group consisting of poly(pyrimidines), polyimidazoles, polybenzoxazoles, poly(pyridines), and polybenzimidazoles.

26. The acid fuel cell according to claim 23 wherein said polymer is polybenzimidazole.

27. The acid fuel cell according to claim 23 wherein said solid polymer electrolyte membrane comprises phosphoric acid doped polybenzimidazole.

28. An electrolytic cell containing a solid polymer electrolyte membrane comprising an acid doped polymer where the membrane is stable at temperatures in excess of 100° C. wherein said proton conducting polymer is a polymer doped with a strong acid at an acid doping level of at least 200 mol %.

29. The electrolytic cell according to claim 28 wherein said polymer is selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles.

30. The electrolytic cell according to claim 28 wherein said polymer is selected from the group consisting of poly(pyrimidines), polyimidazoles, polybenzoxazoles, poly(pyridines), and polybenzimidazoles.

31. The electrolytic cell according to claim 28 wherein said polymer is polybenzimidazole.

32. The electrolytic cell according to claim 28 wherein said solid polymer electrolyte membrane comprises phosphoric acid doped polybenzimidazole.

\* \* \* \* \*

UNITED STATES PATENT AND TRADEMARK OFFICE
CERTIFICATE OF CORRECTION

PATENT NO. : 5,525,436
DATED : June 11, 1996
INVENTOR(S) : Robert F. Savinell et al.

It is certified that error appears in the above-identified patent and that said Letters Patent is hereby corrected as shown below:

<u>Column 1, after the title</u>; please insert the following paragraph:

---This invention was made with government support under Grant No. DARPA N00014-92-J-1848. The government has certain rights in this invention.---

Signed and Sealed this

Twenty-second Day of May, 2001

Attest:

NICHOLAS P. GODICI

Attesting Officer

Acting Director of the United States Patent and Trademark Office